(12) United States Patent
Terriberry

(10) Patent No.: US 9,665,541 B2
(45) Date of Patent: May 30, 2017

(54) ENCODING VIDEO DATA USING REVERSIBLE INTEGER APPROXIMATIONS OF ORTHONORMAL TRANSFORMS

(71) Applicant: Timothy B. Terriberry, Mountain View, CA (US)

(72) Inventor: Timothy B. Terriberry, Mountain View, CA (US)

(73) Assignee: MOZILLA CORPORATION, Mountain View, CA (US)

(*) Notice: Subject to any disclaimer, the term of this patent is extended or adjusted under 35 U.S.C. 154(b) by 343 days.

(21) Appl. No.: 14/262,626

(22) Filed: Apr. 25, 2014

(65) Prior Publication Data

US 2014/0348221 A1 Nov. 27, 2014

Related U.S. Application Data

(63) Continuation-in-part of application No. 14/187,081, filed on Feb. 21, 2014.

(60) Provisional application No. 61/815,959, filed on Apr. 25, 2013, provisional application No. 61/979,898, filed on Apr. 15, 2014.

(51) Int. Cl.
*H04N 19/625* (2014.01)
*G06F 17/14* (2006.01)
*H04N 19/63* (2014.01)

(52) U.S. Cl.
CPC ......... *G06F 17/147* (2013.01); *H04N 19/625* (2014.11); *H04N 19/63* (2014.11)

(58) Field of Classification Search
CPC .............................................. H04N 19/00812

USPC ....................................................... 375/240.2
See application file for complete search history.

(56) References Cited

U.S. PATENT DOCUMENTS

| | | | |
|---|---|---|---|
| 6,925,119 B2 | 8/2005 | Bartolucci | |
| 8,160,149 B2 | 4/2012 | Demos | |
| 8,694,325 B2 | 4/2014 | Lin | |
| 8,838,442 B2 | 9/2014 | Terriberry | |
| 8,874,450 B2 | 10/2014 | Peng | |
| 9,015,052 B2 | 4/2015 | Lin | |
| 2004/0083110 A1 | 4/2004 | Wang | |
| 2008/0075191 A1* | 3/2008 | Haartsen | H04L 27/2614 375/285 |
| 2012/0071710 A1* | 3/2012 | Gazdzinski | A61B 1/00016 600/101 |
| 2014/0286399 A1 | 9/2014 | Valin | |

OTHER PUBLICATIONS

Tran et al., "Lapped Transform via Time-Domain Pre- and Post-Filtering", Jun. 2003, IEEE Transactions on Signal Processing, vol. 51, No. 6, pp. 1557-1571.*
"Decomposed Pyramid Vector Quantization by Using Barness-Wall Lattice" Milhalik; 2001.

(Continued)

*Primary Examiner* — Christopher S Kelley
*Assistant Examiner* — Jonathan Messmore
(74) *Attorney, Agent, or Firm* — Dergosits & Noah LLP; Todd A. Noah

(57) ABSTRACT

An apparatus and method for lossless encoding of video data is provided, including a reversible transform, connected to a plurality of inputs, having a same plurality of orthonormal outputs, wherein the reversible transform comprises rotations combined with internally cancelled scalings that are connected to said orthonormal outputs.

16 Claims, 6 Drawing Sheets

(56) References Cited

OTHER PUBLICATIONS

"A Pyramid Vector Quantizer"; Fischer; 1986.
"Video Coding Scheme Using DCT Pyramid VQ"; Alessandro; 1995.
"Scalable Image Coding Using Gaussian Pyramid Vector Quantization with Resolution-Independent Block Size"; by Cieplinski and Bober.

* cited by examiner

ENCODING VIDEO DATA USING REVERSIBLE INTEGER APPROXIMATIONS OF ORTHONORMAL TRANSFORMS

CROSS-REFERENCE TO RELATED APPLICATIONS

This application claims the benefit of U.S. Provisional Patent Application 61/815,959 filed on Apr. 25, 2013, entitled "Methods and Systems for Efficient, Reversible Integer Approximations of the Discrete Cosine Transform with Minimal Dynamic Range Expansion", and U.S. Provisional Patent Application 61/979,898, filed on Apr. 15, 2014, entitled "Methods and Systems for Efficient, Reversible Integer Approximation of the Walsh-Hadamard Transform with Minimal Dynamic Range Expansion", and is a continuation-in-part of U.S. patent application Ser. No. 14/187,081 filed on Feb. 21, 2014, entitled "PYRAMID VECTOR QUANTIZATION FOR VIDEO CODING", which are all incorporated by reference herein in their entireties.

BACKGROUND

Coding systems, such as image and video encoders, typically encode associated data for streaming from a source to a destination. A transform, such as the Discrete Cosine Transform (DCT), is traditionally at the center of image and video compression algorithms. Lifting steps, wherein a single sub-band is modified solely as a function of the other sub-bands at each step, can be used to implement the DCT and other transforms permitting perfect reconstruction. An advantage of using lifting steps is that when intermediate operations are performed using integer arithmetic, they can be made exactly reversible.

Lifting steps may have been used to implement a reversible integer approximation of the 4-point DCT. Unfortunately, the resulting implementation would have required many more multiplications than the best known algorithms, and would have produced outputs that were scaled by a factor of two compared to an orthonormal DCT. The latter poses a particular problem for lossless compression. Such implementations would have mixed the low-order bits of the input, which may be mostly uncorrelated random noise, to produce an additional bit of output with high apparent entropy. Since such an implementation would have been applied twice for two-dimensional images, this would have produced one extra bit per pixel of difficult-to-compress data to code versus the orthonormal case.

Other implementations of the DCT may have used a different scale factor for each output to save additional multiplications, since the DCT is often directly followed by a quantization step, which can sometimes absorb these additional scale factors. Unfortunately, there is no extra quantization step when using lossless compression; and even when using lossy compression, non-uniform scaling may complicate any additional processing applied to the transform coefficients before quantization. Embodiments of the present disclosure address these and other issues.

SUMMARY

These and other drawbacks and disadvantages of the prior art are addressed by an apparatus and corresponding method for lossless encoding of data, such as video data.

An exemplary method for lossless encoding of data includes receiving the data, and applying a reversible transform having orthonormal outputs to the received data, wherein the reversible transform combines rotations with internally cancelled scalings to achieve the orthonormal outputs. In a further exemplary embodiment method, the transform is an $2^n$ point reversible transform having $2^n$ inputs and $2^n$ orthonormal outputs, where n is an integer, each pair of the $2^n$ inputs are connected to a respective transform stage, the outputs from all but the last of which are scaled by an asymmetrical factor and connected to at least one further transform stage that collectively cancel the asymmetrical factor, and the outputs of the transform stages comprise the orthonormal outputs of the transform.

An exemplary embodiment apparatus for lossless encoding of data includes a plurality of inputs for receiving the data, and a reversible transform, connected to the inputs, having a same plurality of orthonormal outputs, wherein the reversible transform comprises rotations combined with internally cancelled scalings that are connected to said orthonormal outputs. In a further exemplary embodiment apparatus, the transform is a $2^n$ point reversible transform having $2^n$ inputs and $2^n$ orthonormal outputs, where n is an integer, each pair of the $2^n$ inputs are connected to a respective transform stage, the outputs from all but the last stage of which are scaled by an asymmetrical factor and connected to at least one further transform stage that collectively cancel the asymmetrical factor, and the outputs of the transform stages comprise the orthonormal outputs of the transform.

An exemplary embodiment computer program product for lossless encoding of data includes a non-transitory computer-readable medium having a computer-readable program code embodied therein to be executed by one or more processors, the program code including instructions to receive the data, and apply a reversible transform having orthonormal outputs to the received data, wherein the reversible transform combines rotations with internally cancelled scalings to achieve said orthonormal outputs. In a further exemplary embodiment computer program product, the transform is an $2^n$ point reversible transform having $2^n$ inputs and $2^n$ orthonormal outputs, where n is an integer, each pair of the $2^n$ inputs are connected to a respective transform stage, the outputs from all but the last of which are scaled by an asymmetrical factor and connected to at least one further transform stage that cancels the asymmetrical factor; and the outputs of the transform stages comprise the orthonormal outputs of the transform.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches pyramid vector quantization for video coding in accordance with the following exemplary figures, in which.

DETAILED DESCRIPTION OF PREFERRED EMBODIMENTS

Figure 1:
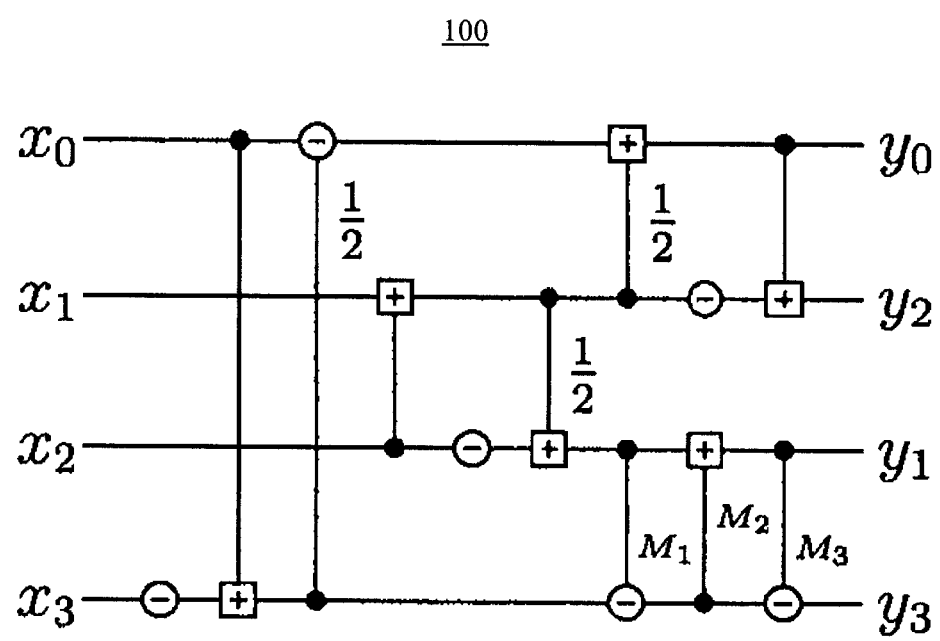
FIG. 1 shows a ladder diagram for a reversible 4-point Discrete Cosine Transform (DCT) with orthonormal scaling in accordance with the principles of the present disclosure.

The present disclosure defines an apparatus and method for encoding data using reversible integer approximations of orthonormal transforms, including but not limited to the Discrete Cosine Transform (DCT) and the Walsh-Hadamard Transform (WHT). The exemplary systems and methods, which are particularly applicable to video data, provide efficient and reversible integer approximations of transforms, such as the discrete cosine transform, with minimal dynamic range expansion.

The Discrete Cosine Transform (DCT) has been at the center of image and video compression algorithms for decades. Lifting steps, wherein at each step a single sub-band is modified solely as a function of the other sub-bands, can be used to implement the DCT, or any other transform that gives perfect reconstruction. An advantage of using lifting steps is that when intermediate operations are performed using integer arithmetic, they can be made exactly reversible. Uniformly scaled transforms are addressed herein.

It is not possible to do better than orthonormal scaling and still maintain a reversible transform using approximately linear operations. Applying a transform with smaller scaling to an independent and identically distributed (i.i.d.) Gaussian white noise source with a given variance produces i.i.d. Gaussian white noise with variances scaled by the magnitude of the transform basis functions. If these magnitudes are less than one, the underlying entropy of the transform output would be smaller than that of the transform input, making it impossible to transform the result back into the original without violating Shannon's source coding theorem. It is possible to make reversible transforms with no dynamic range expansion by using "piecewise-linear" rotations, but each step requires a large number of operations in a software implementation, and the result may be quite far from the orthogonal transform being approximated.

Decompositions of the DCT into lifting steps commonly break the transform down into a series of orthonormal plane rotations, possibly scaling the outputs by some common factor. Each rotation requires three lifting steps composed of one multiplication and one addition each as defined by <Equation 1>, <Equation 2> and <Equation 3> contained in Appendix I, Table A, where xi and xj are the inputs, and yi and yj are the outputs. This implements the transform of <Equation 4>.

As a special case, rotations by pi/4 can be implemented using two lifting steps with no multiplications, saving three multiplications and one addition as defined by <Equation 5> and <Equation 6>. This implements the transform of <Equation 7>. The order of the inputs or outputs can also be swapped, or one of the outputs negated, without impacting the complexity of the transform. The collective set of such transformations are commonly called "butterflies". "Butterfly" is a term of art for a transform stage that performs rotations by pi/4, with variations in output order and sign flips depending on the implementation. It so happens that the first stage of every forward transform used in preferred embodiments is comprised of butterflies.

Minimum complexity transforms are achieved by factoring the transform into as few rotations as possible and maximizing the number of such rotations that are implemented as butterflies. Unfortunately, each butterfly implemented in this manner scales up its outputs by a factor of the square-root of 2.

It is possible to implement a butterfly which does not increase the scaling on average, without any extra additions or multiplications, if the outputs are scaled asymmetrically per <Equation 8> and <Equation 9>. The scaling by ½ can be accomplished with a shift, which is free in a hardware implementation. This implements the transform of <Equation 10>. The overall determinant remains one.

Although the outputs are no longer uniformly scaled, additional transform stages can restore uniformity by taking asymmetrically scaled inputs. For example, if xi is scaled by a factor of 2 relative to xk, <Equation 11> and <Equation 12> yield a rotation with uniformly scaled outputs yk and yi. That is, it implements the transform of <Equation 13>. By matching asymmetrically scaled butterfly outputs to asymmetrically scaled butterfly inputs, much of the asymmetry can be eliminated, but not all of it.

A 4-point DCT requires at least one rotation by an odd multiple of pi/8, which cannot be implemented as a simple butterfly. In an efficient factorization, however, each input to that rotation passes through exactly one butterfly beforehand. That means each input will be scaled by the square-root of 2 or the square-root of ½. If they are both scaled by the square-root of 2, no series of lifting steps can reduce the scaling back to 1. If they are both scaled by the square-root of ½, then the other half of the transform has the same problem. However, if they are asymmetrically scaled, it is possible to construct a series of lifting steps which undoes the scaling and then applies the rotation, producing uniformly scaled outputs. This can be done in three lifting steps, the same as a rotation by itself, with no additional complexity, as shown in <Equation 14>, <Equation 15> and <Equation 16>. This implements the transform of <Equation 17>. Putting these together, we have built a reversible 4-point DCT with orthonormal scaling, as illustrated in the ladder diagram of FIG. 1. Thus, <Equation 1>, which implements the 3 steps of <Equation 14>, <Equation 15> and <Equation 16> combines rotations and scalings into a set of three lifting steps. While one might use 3 lifts just to do rotation, the presently disclosed embodiments have scalings included as well.

As shown in FIG. 1, a reversible 4-point DCT with orthonormal scaling is indicated generally by the reference number 100. The DCT 100 requires only 3 multiplies and 9 additions, plus 2 shifts. Although there are 3 transform stages, and each one requires a shift, two of those may be shared. Here, it is a particular advantage that the x1 outputs are scaled by ½ in two different stages, and can so be used in both the y0 and y1 computations. That is, the DCT 100 has a first stage that produces asymmetric outputs, and a second stage that takes asymmetric inputs and cancels the asymmetries of the first stage. In the DCT 100, two stages are arranged so that some computations, such as shifts in the DCT, or an additional subtraction in an alternate embodiment Walsh-Hadamard Transform (WHT), can be shared.

Table 1 in Appendix I summarizes the constants for the multiplications of FIG. 1. In the ladder diagram, the xi's form the input to the transform, and the yi's form the output, in a permuted order. A circled minus by itself indicates that the value of the current line is negated. A boxed plus or circled minus joining two lines, possibly with a constant to the right of the vertical line, indicates that the value of the vertical line is scaled by the constant, if any, and then added to or subtracted from the value of the horizontal line, respectively. The small, solid dots indicate the source of a value for a vertical line. Irrational constants are listed in Table 1 to avoid cluttering the diagram. This diagram is converted to a reversible integer transform by using integer versions of all operations with fixed point approximations of the constants. The inverse transform is obtained simply by running all of the operations in reverse.

Figure 2:
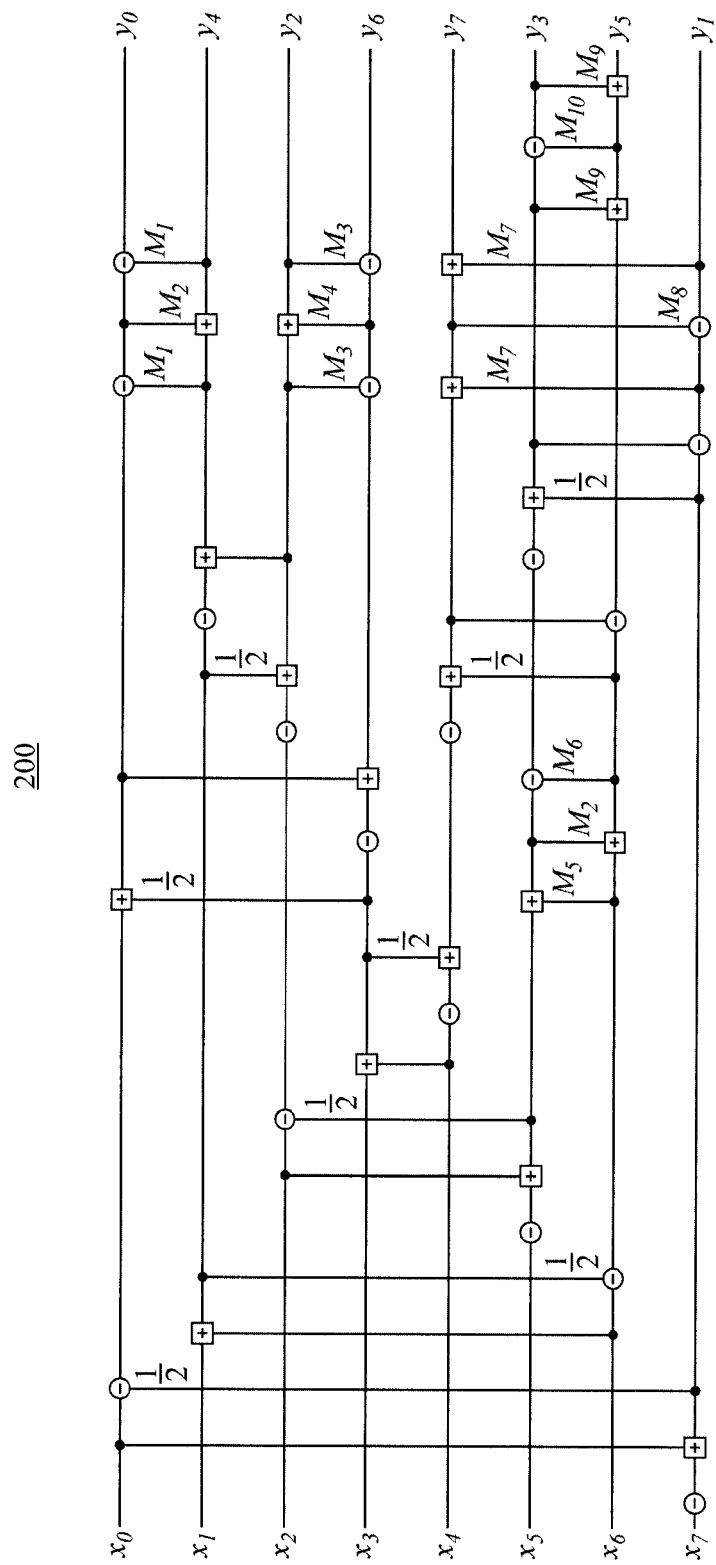
FIG. 2 shows a ladder diagram for a reversible 8-point DCT with orthonormal scaling in accordance with the principles of the present disclosure.

Turning to FIG. 2, a ladder diagram for a reversible 8-point DCT with orthonormal scaling is indicated generally by the reference number 200. For the 8-point DCT 200, the scaled rotations above can also be extended to support arbitrary scaling of the outputs as well, as shown by <Equation 18>. Using the same three lifting steps as before, this is implemented via <Equation 19>, <Equation 20> and <Equation 21>.

Table 2 in Appendix I summarizes the constants for the multiplications in FIG. 2. The minimum number of multiplications required to implement a uniformly scaled 8-point DCT is 11. Unfortunately, it does not seem possible to implement a reversible integer 8-point DCT with orthonormal scaling using just 11 multiplications. The reason is that computing the DC coefficient requires three butterfly stages, which is an odd number. The first stage adds asymmetry, the second removes it, and in order for the third stage to avoid adding it again, it must be implemented as a rotation using three multiplies. The odd part gains another multiply, as there are two scale factors of the square-root of 2 that cannot be applied directly.

Scaling directly by values larger than 1 implies a determinant greater than 1. Since no lifting steps can have a determinant less than 1 and remain reversible, it becomes impossible to maintain the overall orthonormal scaling. Scaling directly by values smaller than 1 is itself not reversible. The two scale factors can, however, be applied as part of a rotation by pi/4, using three multiplies instead of two. The result is an 8-point transform that uses 15 multiplies and 31 additions, plus 5 shifts, as illustrated in FIG. 2.

Although there are 8 simple stages in this factorization, each requiring a shift, careful arrangement allows three pairs of them to be shared. It is possible to implement a 2-D 8×8 DCT without introducing these extra multiplies, but this requires 4 versions of the 1-D transform: two each that produce asymmetrically scaled outputs with the asymmetry skewed in opposite directions, and then two more that take asymmetrically scaled inputs with the asymmetry skewed in opposite directions.

Figure 3:
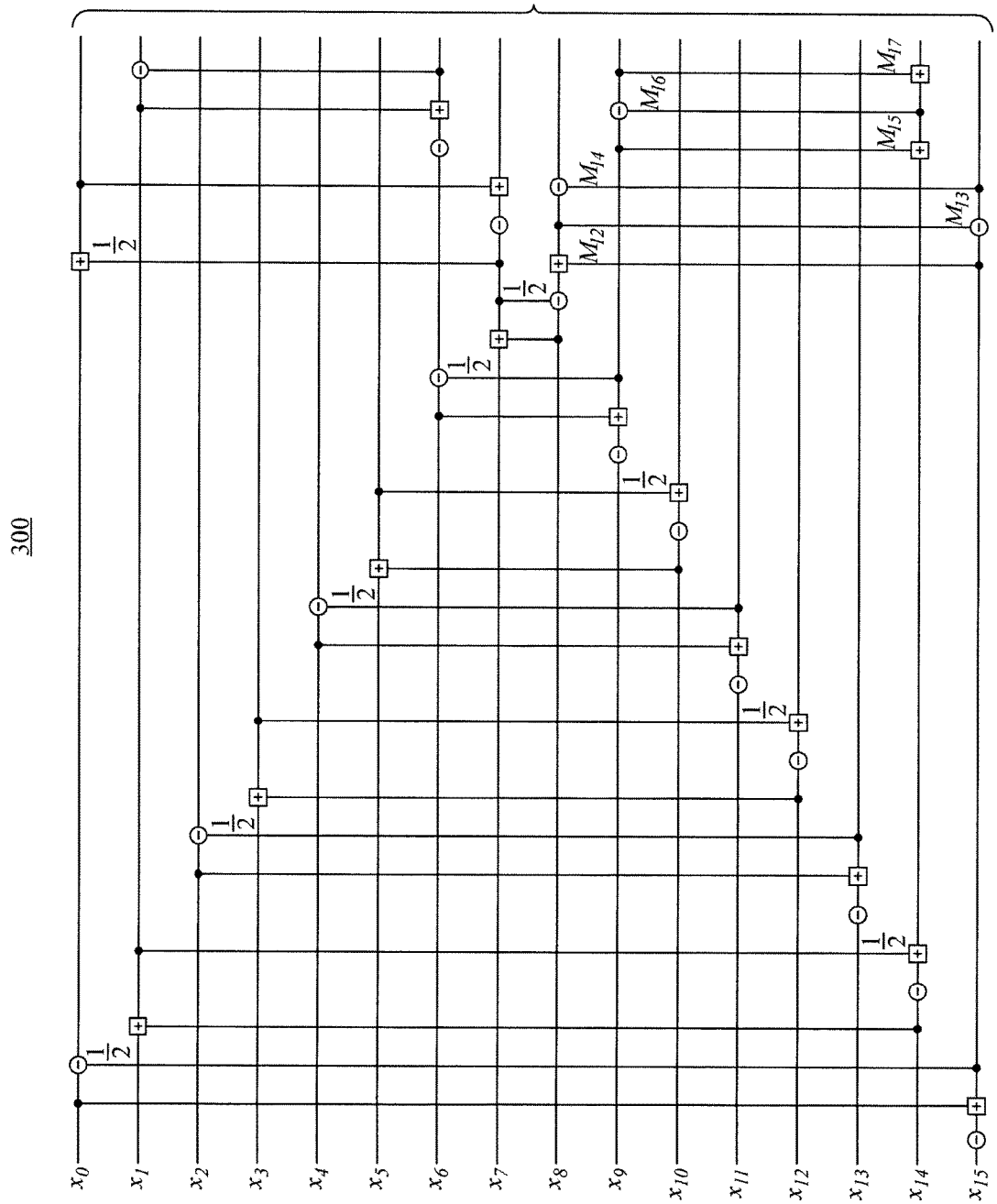
FIG. 3 shows a ladder diagram for a reversible 16-point DCT with orthonormal scaling in accordance with the principles of the present disclosure.
Figure 3:
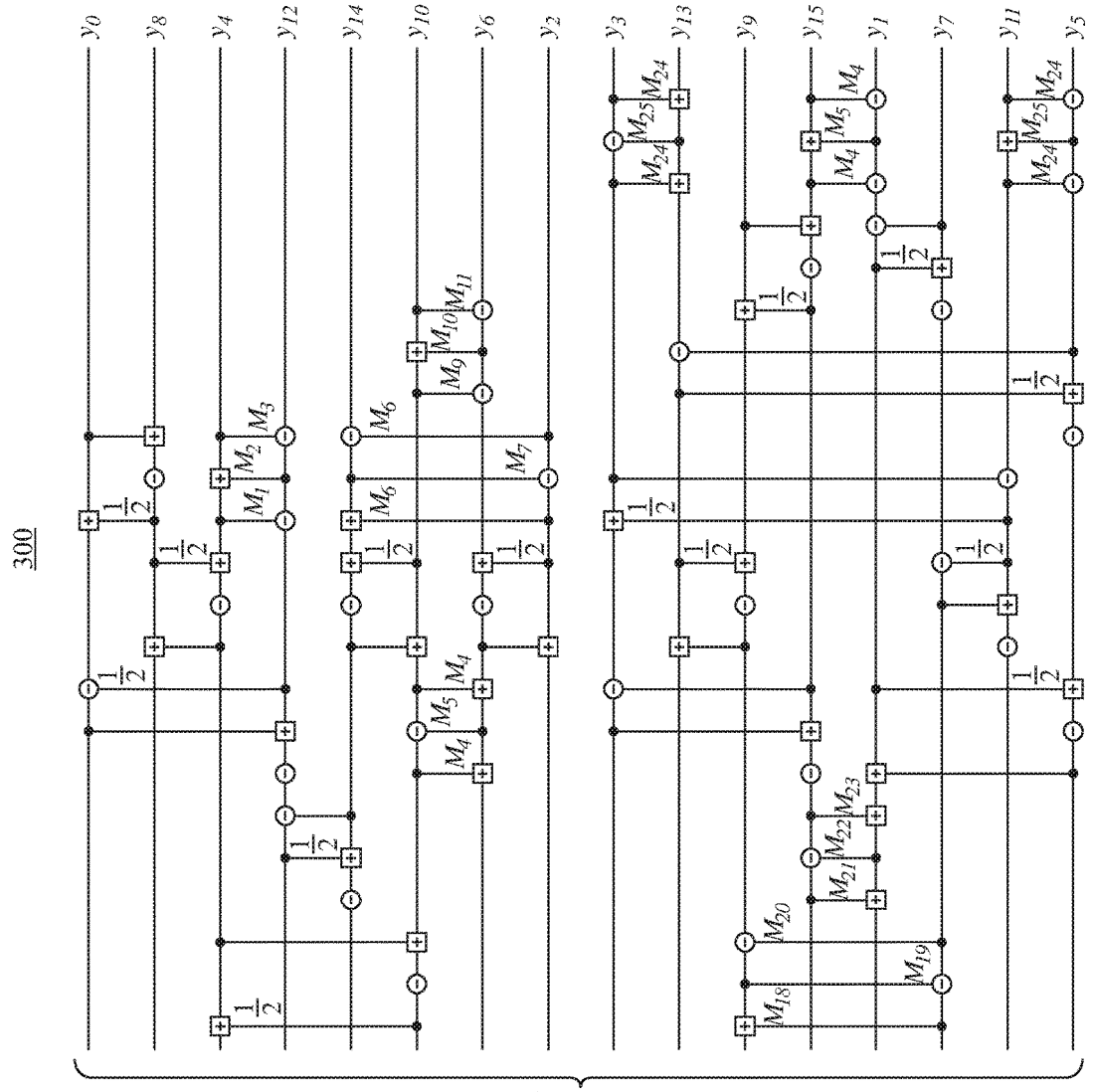

Turning now to FIG. 3, a ladder diagram for a reversible 16-point DCT with orthonormal scaling is indicated generally by the reference numeral 300. Table 3 in Appendix I contains the constants for the multiplications in FIG. 3. For a 16-point DCT, the minimum number of multiplications required to implement a uniformly scaled 16-point DCT is 26, although the best-known practical implementation requires 31. The odd half contains four scale factors of the square-root of 2, which again cannot be implemented directly. As with the 8-point DCT, these can be replaced by two rotations by pi/4 at the cost of six multiplies instead of four. Otherwise, using the techniques described earlier produces a 16-point transform that uses 33 multiplies and 83 additions, plus 16 shifts, as illustrated by the DCT 300. Although there are 25 simple transform stages in this factorization, each requiring a shift, careful arrangement allows nine pairs of them to be shared.

Exemplary reversible DCTs with uniform scaling have been described herein. These particular DCTs are reversible for lossless compression. Exemplary embodiments use uniform scaling outputs. Scalings are okay with quantization. Additional processing is done in the frequency domain, such as time-frequency resolution scaling, using various frequency domain prediction techniques.

Thus, a particularly preferred exemplary embodiment DCT is reversible with uniform scale. Embodiments may be scaled up by a minimum amount with minimum dynamic range, as one would have been even without irrational constants. The building blocks of the exemplary embodiment DCTs are based on rotations in combination with scales. Although 4, 8, and 16 point exemplary DCTs have been described, the techniques may be extended to additional point DCTs, and would work for 32-point DCTs and the like.

Figure 4:
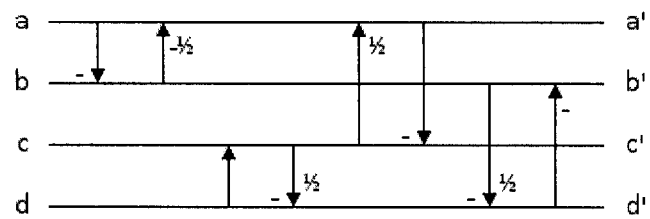
FIG. 4 shows a ladder diagram for a reversible 4-point Walsh-Hadamard Transform (WHT) with orthonormal scaling in accordance with the principles of the present disclosure.

As shown in FIG. 4, a reversible 4-point WHT with orthonormal scaling is indicated generally by the reference number 400. The WHT 400 is the reversible, orthonormal Walsh-Hadamard Transform obtained by linking two asymmetrically scaled stages of butterflies together. Here, two stages are arranged so that some computations, such as an additional subtraction in the Walsh-Hadamard transform, can be shared. No constants are needed other than the ½'s or shifts of FIG. 4, because Walsh-Hadamard Transforms have no multiplies.

Figure 5:
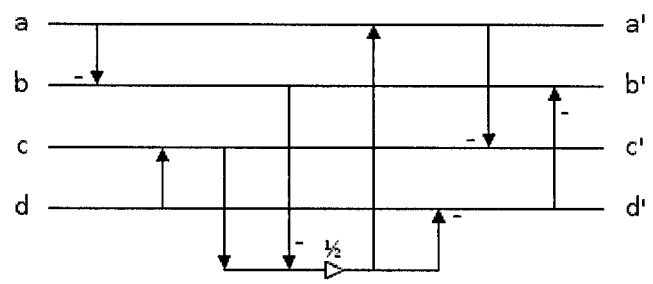
FIG. 5 shows a ladder diagram for another reversible 4-point WHT with orthonormal scaling in accordance with the principles of the present disclosure.

Turning to FIG. 5, a reversible 4-point WHT with orthonormal scaling is indicated generally by the reference number 500. The WHT 500 takes advantage of algebraic simplification to eliminate some redundant computations.

For the Walsh-Hadamard Transforms, a four-point transform may be used to transform 4×4 blocks into a 16×16 block and vice versa. A four-point DCT requires multiplies. Of course, we could use a two-point DCT to transform from 4×4 to 8×8 and then use a two-point DCT again from 8×8 to 16×16. The resulting transform is not a DCT though, but a Walsh-Hadamard Transform (WHT). Technically, the two-point DCT and WHT, as well as the Haar Wavelet Transform, for that matter, are equivalent. As we've just noted, one cannot build a larger DCT by stacking smaller DCTs. However, stacking two identical Walsh-Hadamard transforms does result in a WHT of twice the size. Since the two-point cases are the same, that's why our stacked 2×2 'DCT' transformed into a 4×4 WHT. As transform size increases, the WHT remains cheap to compute since it has no multiplies.

In the Walsh-Hadamard Transform, the scalings added by one stage are always immediately cancelled in the next stage; but in the DCT, it sometimes takes several further stages to fully cancel all of the asymmetries. The important part is that they are cancelled by the time they reach the outputs of the last stage. For discussion of the WHT transform, see U.S. Provisional Patent Application 61/979,898, filed on Apr. 15, 2014, entitled "Methods and Systems for Efficient, Reversible Integer Approximation of the Walsh-Hadamard Transform with Minimal Dynamic Range Expansion" incorporated herein by reference.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Moreover, the software is preferably implemented as an application program tangibly embodied on a non-transitory program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure.

For example, alternate embodiments may utilize the Walsh-Hadamard or other reversible Transform rather than the Discrete Cosine Transform. All such changes and modifications are intended to be included within the scope of the present disclosure as set forth in the appended claims.

APPENDIX I

TABLE A $$u_i = x_i + \frac{\cos(\theta) - 1}{\sin(\theta)} x_j \quad \text{<Equation 1>}$$

$$y_i = x_j + \sin(\theta) u_i \quad \text{<Equation 2>}$$

$$y_i = u_i + \frac{\cos(\theta) - 1}{\sin(\theta)} y_j \quad \text{<Equation 3>}$$

$$\begin{bmatrix} y_i \\ y_j \end{bmatrix} = \begin{bmatrix} \cos(\theta) & -\sin(\theta) \\ \sin(\theta) & \cos(\theta) \end{bmatrix} \begin{bmatrix} x_i \\ x_j \end{bmatrix} \quad \text{<Equation 4>}$$

$$y_i = x_i - x_j \quad \text{<Equation 5>}$$
$$y_j = 2x_j + y_i \quad \text{<Equation 6>}$$

$$\begin{bmatrix} y_i \\ y_j \end{bmatrix} = \sqrt{2} \begin{bmatrix} \cos(\frac{\pi}{4}) & -\sin(\frac{\pi}{4}) \\ \sin(\frac{\pi}{4}) & \cos(\frac{\pi}{4}) \end{bmatrix} \begin{bmatrix} x_i \\ x_j \end{bmatrix} \quad \text{<Equation 7>}$$

$$y_i = x_i - x_j \quad \text{<Equation 8>}$$

$$y_i = x_i + \frac{1}{2} x_i \quad \text{<Equation 9>}$$

$$\begin{bmatrix} y_i \\ y_j \end{bmatrix} = \begin{bmatrix} \sqrt{2} & 0 \\ 0 & \sqrt{\frac{1}{2}} \end{bmatrix} \begin{bmatrix} \cos(\frac{\pi}{4}) & -\sin(\frac{\pi}{4}) \\ \sin(\frac{\pi}{4}) & \cos(\frac{\pi}{4}) \end{bmatrix} \begin{bmatrix} x_i \\ x_j \end{bmatrix} \quad \text{<Equation 10>}$$

TABLE A-continued $$y_k = x_k - \frac{1}{2} x_i \quad \text{<Equation 11>}$$

$$y_i = x_i + x_k \quad \text{<Equation 12>}$$

$$\begin{bmatrix} y_k \\ y_i \end{bmatrix} = \begin{bmatrix} \cos(\frac{\pi}{4}) & -\sin(\frac{\pi}{4}) \\ \sin(\frac{\pi}{4}) & \cos(\frac{\pi}{4}) \end{bmatrix} \begin{bmatrix} \sqrt{2} & 0 \\ 0 & \sqrt{\frac{1}{2}} \end{bmatrix} \begin{bmatrix} x_i \\ x_j \end{bmatrix} \quad \text{<Equation 13>}$$

$$u_i = x_i + \frac{\frac{1}{s}\cos(\theta) - 1}{s \sin(\theta)} x_j \quad \text{<Equation 14>}$$

$$y_j = x_j + s \sin(\theta) u_i \quad \text{<Equation 15>}$$

$$y_i = u_i + \frac{s \cos(\theta) - 1}{s \sin(\theta)} y_j \quad \text{<Equation 16>}$$

$$\begin{bmatrix} y_i \\ y_j \end{bmatrix} = \begin{bmatrix} \cos(\theta) & -\sin(\theta) \\ \sin(\theta) & \cos(\theta) \end{bmatrix} \begin{bmatrix} s & 0 \\ 0 & \frac{1}{s} \end{bmatrix} \begin{bmatrix} x_i \\ x_j \end{bmatrix} \quad \text{<Equation 17>}$$

$$\begin{bmatrix} y_i \\ y_j \end{bmatrix} = \begin{bmatrix} u & 0 \\ 0 & \frac{1}{stu} \end{bmatrix} \begin{bmatrix} \cos(\theta) & -\sin(\theta) \\ \sin(\theta) & \cos(\theta) \end{bmatrix} \begin{bmatrix} s & 0 \\ 0 & t \end{bmatrix} \begin{bmatrix} x_i \\ x_j \end{bmatrix} \quad \text{<Equation 18>}$$

$$u_i = x_i + \frac{t(\cos(\theta) - su)}{s \sin(\theta)} x_j \quad \text{<Equation 19>}$$

$$y_j = x_j + \frac{1}{tu} \sin(\theta) u_i \quad \text{<Equation 20>}$$

$$y_i = u_i + \frac{tu(su \cos(\theta) - 1)}{\sin(\theta)} y_j \quad \text{<Equation 21>}$$

TABLE 1

| Label | Exact | Approximate |
|---|---|---|
| $M_1$ | $\dfrac{\sqrt{2} - 2\cos\left(\frac{3\pi}{8}\right)}{\sin\left(\frac{3\pi}{8}\right)}$ | 0.7023066 |
| $M_2$ | $\sqrt{\dfrac{1}{2}} \sin\left(\dfrac{3\pi}{8}\right)$ | 0.6532815 |
| $M_3$ | $\dfrac{\sqrt{2} - \cos\left(\frac{3\pi}{8}\right)}{\sin\left(\frac{3\pi}{8}\right)}$ | 1.1165202 |

TABLE 2

| Label | Exact | Approximate |
|---|---|---|
| $M_1$ | $\sqrt{2} - 1$ | 0.4142136 |
| $M_2$ | $\sqrt{\dfrac{1}{2}}$ | 0.7071068 |

TABLE 2-continued

| Label | Exact | Approximate |
|---|---|---|
| $M_3$ | $\dfrac{1-\cos\left(\frac{3\pi}{8}\right)}{\sin\left(\frac{3\pi}{8}\right)}$ | 0.6681786 |
| $M_4$ | $\sin\left(\frac{3\pi}{8}\right)$ | 0.9238795 |
| $M_5$ | $2-\sqrt{2}$ | 0.5857864 |
| $M_6$ | $\sqrt{2}-\frac{1}{2}$ | 0.9142136 |
| $M_7$ | $\dfrac{1-\cos\left(\frac{\pi}{16}\right)}{\sin\left(\frac{\pi}{16}\right)}$ | 0.0984814 |
| $M_8$ | $\sin\left(\frac{\pi}{16}\right)$ | 0.1950903 |
| $M_9$ | $\dfrac{1-\cos\left(\frac{3\pi}{16}\right)}{\sin\left(\frac{3\pi}{16}\right)}$ | 0.3033467 |
| $M_{10}$ | $\sin\left(\frac{3\pi}{16}\right)$ | 0.5555702 |

TABLE 3

| Label | Exact | Approximate |
|---|---|---|
| $M_1$ | $\dfrac{\sqrt{2}-2\cos\left(\frac{3\pi}{8}\right)}{\sin\left(\frac{3\pi}{8}\right)}$ | 0.7023066 |
| $M_2$ | $\sqrt{\frac{1}{2}}\sin\left(\frac{3\pi}{8}\right)$ | 0.6532815 |
| $M_3$ | $\dfrac{\sqrt{2}-\cos\left(\frac{3\pi}{8}\right)}{\sin\left(\frac{3\pi}{8}\right)}$ | 1.1165202 |
| $M_4$ | $\sqrt{2}-1$ | 0.4142136 |
| $M_5$ | $\sqrt{\frac{1}{2}}$ | 0.7071068 |
| $M_6$ | $\dfrac{\sqrt{2}-\cos\left(\frac{\pi}{16}\right)}{2\sin\left(\frac{\pi}{16}\right)}$ | 1.1108400 |
| $M_7$ | $\sqrt{2}\sin\left(\frac{\pi}{16}\right)$ | 0.2758994 |
| $M_8$ | $\dfrac{\cos\left(\frac{\pi}{16}\right)-\sqrt{\frac{1}{2}}}{\sin\left(\frac{\pi}{16}\right)}$ | 1.4028297 |

TABLE 3-continued

| Label | Exact | Approximate |
|---|---|---|
| $M_9$ | $\dfrac{\sqrt{2}-\cos\left(\frac{3\pi}{16}\right)}{2\sin\left(\frac{3\pi}{16}\right)}$ | 0.5244557 |
| $M_{10}$ | $\sqrt{2}\sin\left(\frac{3\pi}{16}\right)$ | 0.7856950 |
| $M_{11}$ | $\dfrac{\cos\left(\frac{3\pi}{16}\right)-\sqrt{\frac{1}{2}}}{\sin\left(\frac{3\pi}{16}\right)}$ | 0.2238472 |
| $M_{12}$ | $\dfrac{\sqrt{2}-\cos\left(\frac{7\pi}{32}\right)}{2\sin\left(\frac{7\pi}{32}\right)}$ | 0.5053672 |
| $M_{13}$ | $\sqrt{2}\sin\left(\frac{7\pi}{32}\right)$ | 0.8971676 |
| $M_{14}$ | $\dfrac{\cos\left(\frac{7\pi}{32}\right)-\sqrt{\frac{1}{2}}}{\sin\left(\frac{7\pi}{32}\right)}$ | 0.1038846 |
| $M_{15}$ | $\dfrac{\sqrt{2}-\cos\left(\frac{11\pi}{32}\right)}{2\sin\left(\frac{11\pi}{32}\right)}$ | 0.5345244 |
| $M_{16}$ | $\sqrt{2}\sin\left(\frac{11\pi}{32}\right)$ | 1.2472250 |
| $M_{17}$ | $\dfrac{\sqrt{\frac{1}{2}}-\cos\left(\frac{11\pi}{32}\right)}{\sin\left(\frac{11\pi}{32}\right)}$ | 0.2672688 |
| $M_{18}$ | $\dfrac{\sqrt{2}-\cos\left(\frac{3\pi}{32}\right)}{2\sin\left(\frac{3\pi}{32}\right)}$ | 0.7876289 |
| $M_{19}$ | $\sqrt{2}\sin\left(\frac{3\pi}{32}\right)$ | 0.4105245 |
| $M_{20}$ | $\dfrac{\cos\left(\frac{3\pi}{32}\right)-\sqrt{\frac{1}{2}}}{\sin\left(\frac{3\pi}{32}\right)}$ | 0.8606502 |
| $M_{21}$ | $\dfrac{\sqrt{2}-\cos\left(\frac{15\pi}{32}\right)}{2\sin\left(\frac{15\pi}{32}\right)}$ | 0.6612825 |
| $M_{22}$ | $\sqrt{2}\sin\left(\frac{15\pi}{32}\right)$ | 1.4074037 |
| $M_{23}$ | $\dfrac{\sqrt{\frac{1}{2}}-\cos\left(\frac{15\pi}{32}\right)}{\sin\left(\frac{15\pi}{32}\right)}$ | 0.6120368 |

TABLE 3-continued

| Label | Exact | Approximate |
|-------|-------|-------------|
| $M_{24}$ | $\dfrac{1-\cos\left(\dfrac{3\pi}{8}\right)}{\sin\left(\dfrac{3\pi}{8}\right)}$ | 0.6681786 |
| $M_{25}$ | $\sin\left(\dfrac{3\pi}{8}\right)$ | 0.9238795 |

What is claimed is:

1. A method for lossless encoding of data, comprising:
receiving the data; and
applying a reversible transform approximation having orthonormally scaled outputs to the received data, wherein the reversible transform approximation comprises, the data comprising at least one of image data and video data:
   a first operation that receives the data as inputs and scales outputs asymmetrically;
   a second operation that receives outputs from the first operation as inputs, and cancels the asymmetric scaling; and
   a third operation that applies a rotation to outputs received from the second operation as inputs, wherein outputs of the third operation are orthonormally scaled compared to the inputs of the first operation.

2. The method of claim 1 wherein:
the transform approximation is of a 4-point Discrete Cosine Transform (DCT) having four inputs and four outputs; and
the first operation is a butterfly-type transform stage receiving two of the DCT inputs, further wherein two outputs of the first operation are scaled by ½ and connected to the second operation, the second operation having two outputs.

3. The method of claim 1 wherein:
the transform approximation is of an 8-point Discrete Cosine Transform (DCT) having eight inputs and eight outputs;
the first operation is a butterfly-type transform stage receiving a first two of the DCT inputs, the outputs of the first operation being scaled by ½ and connected to the second operation;
the second operation receives a second two of the inputs, the outputs of the second operation being scaled by ½ and connected to the third operation; and
the third operation comprising a third transform stage and a fourth transform stage, where a third two of the inputs are connected to the third transform stage, the outputs of which are scaled by ½ and connected to a fourth transform stage having two outputs.

4. The method of claim 1 wherein:
the transform approximation is of an $2^n$ point Discrete Cosine Transform (DCT) having $2^n$ inputs and $2^n$ orthonormally scaled outputs, where n is an integer; and
each pair of the $2^n$ inputs are connected to a respective transform stage, the outputs from all but the last of which are scaled by a factor of ½ and connected to at least one further transform stage that collectively cancels the factor.

5. The method of claim 1 wherein:
the transform approximation is of a 4-point Walsh-Hadamard Transform (WHT) having four inputs and four outputs; and
the first operation is a butterfly-type transform stage receiving two of the WHT inputs, further wherein two outputs of the first operation are scaled by ½ and connected to the second operation, the second operation having two outputs.

6. The method of claim 1 wherein the transform approximation is of a Haar Wavelet Transform.

7. The method of claim 1 wherein:
the transform approximation is of a $2^n$ point reversible transform having $2^n$ inputs and $2^n$ orthonormally scaled outputs, where n is an integer;
each pair of the $2^n$ inputs are connected to a respective transform stage, the outputs from all but the last of which are scaled by an asymmetrical factor and connected to at least one further transform stage that collectively cancels the asymmetrical factor; and
the outputs of the transform stages comprise the orthonormally scaled outputs of the transform.

8. An apparatus for lossless encoding of data, comprising:
a plurality of inputs for receiving the data, the data comprising at least one of image data and video data; and
a reversible transform approximation block, connected to the inputs, having a same plurality of orthonormally scaled outputs,
wherein the reversible transform approximation block comprises:
   a first operation that receives the data as inputs and scales outputs asymmetrically;
   a second operation that receives outputs from the first operation as inputs, and cancels the asymmetric scaling; and
   a third operation that applies a rotation to outputs received from the second operation as inputs, wherein outputs of the third operation are orthonormally scaled compared to the inputs of the first operation.

9. The apparatus of claim 8 wherein:
the transform approximation block approximates a 4-point Discrete Cosine Transform (DCT) having four inputs and four outputs; and
the first operation is a butterfly-type transform stage receiving two of the DCT inputs, further wherein two outputs of the first operation are scaled by ½ and connected to the second operation, the second operation having two outputs.

10. The apparatus of claim 8 wherein:
the transform approximation block approximates an 8-point Discrete Cosine Transform (DCT) having eight inputs and eight outputs;
the first operation is a butterfly-type transform stage receiving a first two of the DCT inputs, the outputs of the first operation being scaled by ½ and connected to the second operation;
the second operation receives a second two of the inputs, the outputs of the second operation being scaled by ½ and connected to the third operation; and
the third operation comprising a third transform stage and a fourth transform stage, where a third two of the inputs are connected to the third transform stage, the outputs of which are scaled by ½ and connected to a fourth transform stage having two outputs.

11. The apparatus of claim 8 wherein:

the transform approximation block approximates an $2^n$ point Discrete Cosine Transform (DCT) having $2^n$ inputs and $2^n$ orthonormally scaled outputs, where n is an integer;

each pair of the $2^n$ inputs are connected to a respective transform stage, the outputs from all but the last of which are scaled by a factor of ½ and connected to at least one further transform stage that collectively cancels the factor; and the outputs of the transform stages comprise the orthonormally scaled outputs of the transform approximation block.

12. The apparatus of claim 8 wherein:

the transform approximation block approximates at least a 4-point Walsh-Hadamard Transform (WHT) having four inputs and four outputs; and the first operation is a butterfly-type transform stage receiving two of the WHT inputs, further wherein two outputs of the first operation are scaled by ½ and connected to the second operation, the second operation having two outputs.

13. The apparatus of claim 8 wherein the transform approximation block approximates a Haar Wavelet Transform.

14. The apparatus of claim 8 wherein:

the transform approximation block approximates a $2^n$ point reversible transform having $2^n$ inputs and $2^n$ orthonormally scaled outputs, where n is an integer;

each pair of the $2^n$ inputs are connected to a respective transform stage, the outputs from all but the last of which are scaled by an asymmetrical factor and connected to at least one further transform stage that collectively cancels the asymmetrical factor; and the outputs of the transform stages comprise the orthonormally scaled outputs of the transform approximation block.

15. A computer program product for lossless encoding of data, comprising a non-transitory computer-readable medium having a computer-readable program code embodied therein to be executed by one or more processors, the program code including instructions to:

receive the data, the data comprising at least one of image data and video data; and apply a reversible transform approximation having orthonormally scaled outputs to the received data, wherein the reversible transform approximation comprises:

a first operation that receives the data as inputs and scales outputs asymmetrically;

a second operation that receives outputs from the first operation as inputs, and cancels the asymmetric scaling; and a third operation that applies a rotation to outputs received from the second operation as inputs, wherein outputs of the third operation are orthonormally scaled compared to the inputs of the first operation.

16. The computer program product of claim 15, wherein:

the transform approximation is a $2^n$ point reversible transform having $2^n$ inputs and $2^n$ orthonormally scaled outputs, where n is an integer;

each pair of the $2^n$ inputs are connected to a respective transform stage, the outputs from all but the last of which are scaled by an asymmetrical factor and connected to at least one further transform stage that collectively cancels the asymmetrical factor; and the outputs of the transform stages comprise the orthonormally scaled outputs of the transform.

\* \* \* \* \*